United States Patent [19]

Bavierè et al.

[11] Patent Number: 4,648,451

[45] Date of Patent: Mar. 10, 1987

[54] ENHANCED OIL RÉCOVERY PROCESS BY INJECTING A MICELLAR SOLUTION OF SURFACTANTS HAVING A SOLUBILITY GRADIENT IN WATER

[75] Inventors: Marc Bavierè, Noisy Le Roi; Jean-Claude Moulu, Aubergenville, both of France; Tibor Paál, Nagykanizsa, Hungary; György Tiszai, Nagykanizsa, Hungary; Györgyi Gaál, Nagykanizsa, Hungary; Laszlo Schmidt, Szazhalombatta, Hungary; Gyula Gesztesi, Budapest, Hungary

[73] Assignees: Institut Francais du Petrole, Rueil-Malmaison, France; Magyar Szenhidrogenipari Kutato-Fejleszto Intezet, Szazhalombatta, Hungary

[21] Appl. No.: 696,906

[22] Filed: Jan. 31, 1985

[30] Foreign Application Priority Data

Feb. 3, 1984 [FR] France ................................ 84 01652

[51] Int. Cl.$^4$ ............................................. E21B 43/22
[52] U.S. Cl. .................................................... 166/273
[58] Field of Search ...................... 166/273, 274, 275; 252/8.55 D

[56] References Cited

U.S. PATENT DOCUMENTS

| | | | |
|---|---|---|---|
| 3,344,857 | 10/1967 | Gilchrist | 166/273 |
| 3,455,385 | 7/1969 | Gogarty | 166/274 |
| 3,623,553 | 11/1971 | Burdge | 166/274 X |
| 3,740,343 | 6/1973 | Jones et al. | 166/273 X |
| 3,990,515 | 11/1976 | Wilchester et al. | 166/273 |
| 4,074,759 | 2/1978 | Bousaid | 166/274 X |
| 4,099,569 | 7/1978 | Bousaid | 166/274 X |
| 4,125,158 | 11/1978 | Waite et al. | 166/273 |
| 4,271,907 | 6/1981 | Gale | 166/274 |
| 4,276,933 | 7/1981 | Kudchadker et al. | 166/273 X |
| 4,287,950 | 9/1981 | Baker et al. | 166/273 |
| 4,353,806 | 10/1982 | Canter et al. | 166/274 X |
| 4,433,730 | 2/1984 | Trushenski | 166/274 |
| 4,438,002 | 3/1984 | Schievelbein et al. | 166/274 X |
| 4,463,806 | 8/1984 | Hurd | 166/274 |

Primary Examiner—George A. Suchfield
Attorney, Agent, or Firm—Antonelli, Terry & Wands

[57] ABSTRACT

A process for the enhanced oil recovery in oil reservoirs having a significant cation exchange capacity. A displacement slug is injected into an injection well formed from several successive zones, the solubility in the injection water of the anionic surfactant which it contains being adjusted so as to increase, for compensating the rock-micellar solution interactions, from one zone of the slug to the next considering the order of introducing the different zones of the slug.

10 Claims, 7 Drawing Figures

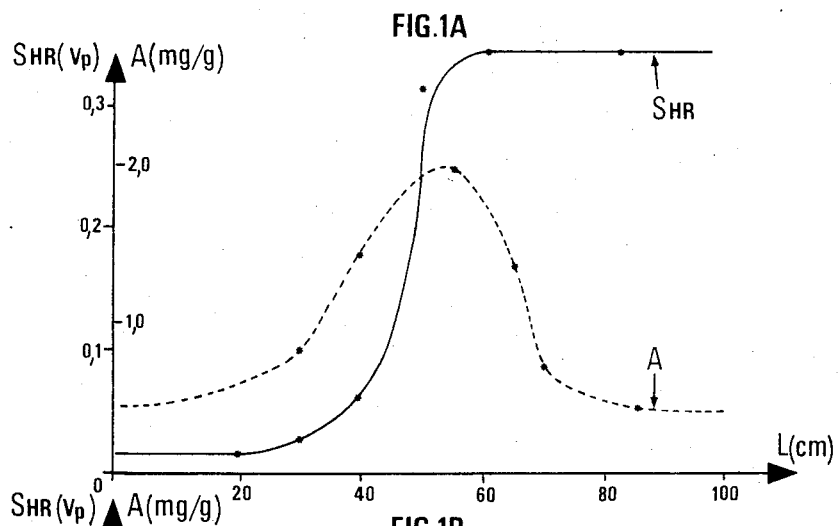
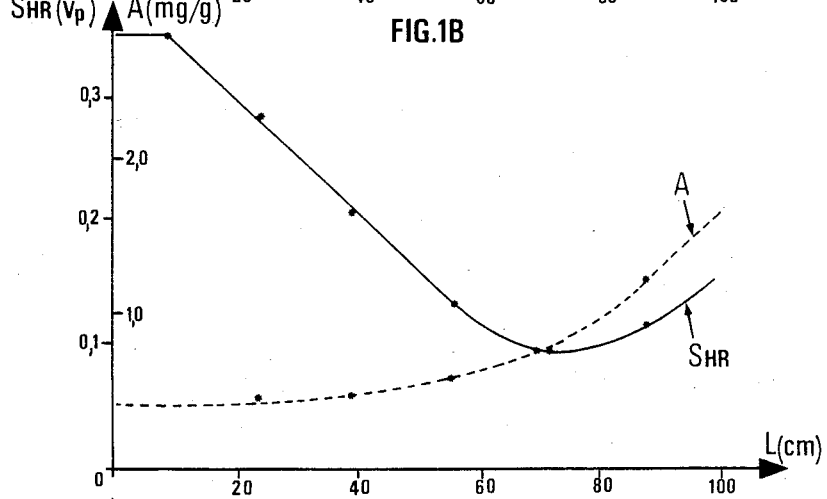
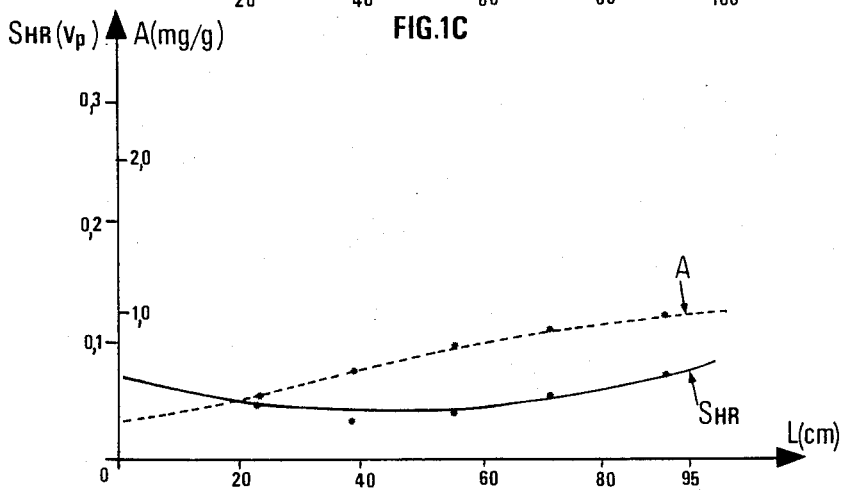

ENHANCED OIL RECOVERY PROCESS BY INJECTING A MICELLAR SOLUTION OF SURFACTANTS HAVING A SOLUBILITY GRADIENT IN WATER

BACKGROUND OF THE INVENTION

1. Field of the Invention

The present invention relates to a process for the enhanced oil recovery using a displacement slug comprising an anionic surfactant and auxiliary agents in oil reservoirs having a significant ion exchange capacity.

2. Description of the Prior Art

Very many types of surfactants have been proposed for effecting enhanced oil recovery. The most widely used surfactants are of the sulfonate type, more precisely petroleum sulfonates, in the form of alkaline metal or ammonium salts.

The surfactant is usually used at a concentration higher than its critical micellar concentration. The injected micellar solutions are either aqueous solutions containing variable amounts of surfactants and, possibly, other additives such as cosurfactant, cosolvent, electrolytes, etc, or mixtures, in variable proportions, of water, electrolytes, hydrocarbons and possibly cosurfactant and/or cosolvent. In this latter case, the presence of polar-apolar molecules in a sufficient concentration, leads to the formation of transparent mixtures, generally called microemulsions.

But it is known that the efficiency of this recovery technique using such surfactants is substantially reduced when the rock contains clays having a high divalent cation exchange capacity. In fact, the reaction, for example, of calcium and magnesium ions with the sulfonates increases the surfactant consumption and makes the process inoperative, following an excessive retention due:

to the precipitation of the surfactant,
to transfer of the surfactant in the hydrocarbon phase and trapping if this phase is immobilized, and
to adsorption of the surfactant on the rock.

Trivalent cations exert an even greater effect but, for the sake of simplicity, only divalent cations will be mentioned in what follows.

In the conventional practice of the process, the surfactant solution to the injected is adapted to the fluids and to the temperature in the reservoir. Optimum efficiency is sought by selecting the molecular weight of the surfactant, its molecular weight distribution and its concentration in the micellar solution following tests using the oil and water from the reservoir, at the temperature of this reservoir.

However, after the composition of the micellar solution has been optimized from the point of view of lowering the interfacial tensions, under given conditions, the initial physico-chemical equilibrium between the rock and the fluids in place is modified by injecting the micellar solutions into the reservoir. These modifications tend to divert the micellar solution from its optimum efficiency and such modifications affect the salinity of the water following the increase in the divalent cation concentration due to the ion exchanges and to the increase of the solubility of the rock in water in the presence of a surfactant. Furthermore, the composition and the concentration of the surfactant are modified by dilution due to the fluids in place and to the pushing fluid and by selective adsorption of certain molecules (chromatographic effect). These changes, imposed by the porous medium, exert a dominating effect which may considerably reduce the expected efficiency of the process.

Numerous formulae have been proposed for preserving the efficiency of the micellar solution and/or reducing the retention of the surfactant.

The U.S. Pat. No. 4,232,737 describes an oil recovery method using surfactants in reservoirs containing water with a high salt content. The fluid injected contains at least two surfactants: an ionic compound, such as petroleum sulfonate, and a surfactant, such as an alcohol or alkylphenolpolyoxyethylene sulfate or sulfonate, so as to obtain solubility of the sulfonate in the water of the reservoir. In this process, several slugs of micellar solution are injected successively, followed by an aqueous solution with low salt content containing a viscosifying agent (hydrosoluble polymer). The salt and surfactant concentration decreases gradually from its maximum value in the first slug to its minimum value in the last slug.

In U.S. Pat. No. 4,074,755, during the injection of a surfactant-polymer system, the ratio of the predominant monovalent cation concentration to the square root of the predominant bivalent cation concentration is maintained at a constant value equal to that met in the reservoir. It is claimed that thus ionic exchanges are avoided in reservoirs with a high ion exchange capacity.

Despite everything, the pilot tests carried out using the processes, heretofore described and using similar methods have often led to failures. The following causes, among others, may be mentioned:

the homogeneous moving fluid optimized for given oil field conditions cannot keep its original efficiency if the conditions change as a result of the phenomena mentioned heretofore and elimination of the formation water by previous injections, when its composition is judged unfavorable, is difficult to carry out because of the heterogeneity of the reservoirs. p Furthermore, the use of a non ionic surfactant alone, less sensitive to the salt content changes, may make the process uneconomic because of its high cost and therefore does not always form an acceptable alternative solution.

When petroleum sulfonates are used in the recovery process, they may be so called mahogany sulfonate which are essentially monosulfonates preferably soluble in the hydrocarbons. Because of their anionic character and their relatively high molecular weight, these surfactants are much more sensitive to concentration changes of the divalent cations than to those of the monovalent cations in water. Now, these changes are considerable for example when the reservoir rock has a high cation exchange capacity or when calcium carbonate for example has been dissolved following an injection of carbon dioxide.

Within certain divalent cation concentration limits, which depend on the average molecular weight of the sulfonate and on its distribution, the micellar solution tolerates these changes although the affinity of the sulfonate for the oil gradually increases. Beyond the upper limit, a qualitive change occurs which causes the formation of reverse viscous emulsions (water in oil). There follows an increase of the residual oil saturation and of the retention of the sulfonate, causing decomposition of the micellar solution.

BRIEF DESCRIPTION OF THE DRAWINGS

The invention will be well understood and all its advantages will be clear from the following description, illustrated by the accompanying drawings in which:

FIG. 1A shows the residual oil saturation and retention of sulfonate after injection of a mahogany type sulfonate soluble in hydrocarbon having an optimized composition, FIG. 1B shows the residual oil saturation and retention of sulfonate after injection of a sulfonate soluble in water, FIG. 1C illustrates the residual oil saturation and retention of sulfonate after injection of a displacement slug in accordance with the invention.

DESCRIPTION OF THE PREFERRED EMBODIMENT

FIG. 1A shows the residual oil saturation $S_{HR}$ expressed as a fraction of the pore volume $V_P$ and the retention A of the sulfonate, in milligrams per gram of rock, in a porous medium of length L (cm) after injection of a micellar solution containing a mahogany type sulfonate, moderately tolerant with respect to divalent ions. It can be seen that the rapid increase in residual oil saturation is accompanied by considerable sulfonate retention.

Less expensive sulfonates may also be used for preparing the micellar solutions. These sulfonates contain, in addition to mahogany sulfonates, monosulfonates having a lower molecular weight, as well as di- and polysulfonates and inorganic salts ($Na_2SO_4$ more especially) which are formed during preparation thereof. The inorganic salt content of the sulfonates of this type also plays an important role in the ion exchange phenomena.

In the present invention, we have observed that, when a micellar solution prepared from such sulfonates is injected into a reservoir rock having a significant cation exchange capacity, its efficiency in moving the oil increases in situ because of interaction with the divalent ions of the rock which pass into solution. This passing into solution caused by the sulfonate solution is shown in the examples described below.

However, the range of favorable divalent cation concentrations depends on the ratio of the concentration of these cations, calcium for example, to that of the sulfonate and on the concentration of sulfonate in the micellar solution. This sulfonate, although more soluble in water than the mahogany sulfonate, may also be trapped, as in example 1A, when the $Ca^{++}$ and sulfonate concentration ratio increases. It seems however that the formation of viscous emulsions which risk clogging up the porous medium is to be feared less. FIG. 1B shows the residual oil saturation $S_{HR}$ expressed as a fraction of the pore volume $V_P$ and the retention A of sulfonate, in milligrams per gram of rock, in the case of injecting a sulfonate of this type. It can be seen that the use of this sulfonate, too hydrophilic with respect to the optimum, leads to the following limitations:

the micellar system does not reach the optimum ratio of the $Ca^{++}$/sulfonate concentrations in the vicinity of the injection well. It is therefore not sufficiently efficient and the residual oil saturation remains relatively high, to compensate the formation of emulsions and trapping thereof beyond the optimum displacement conditions, larger volumes of micellar solution must be injected, but this adversely affects the economy of the process.

Similar difficulties arise when the divalent cation concentration of the formation water is high or when it increases after injection of carbon dioxide in a reservoir rock containing carbonates.

Figure 2D:
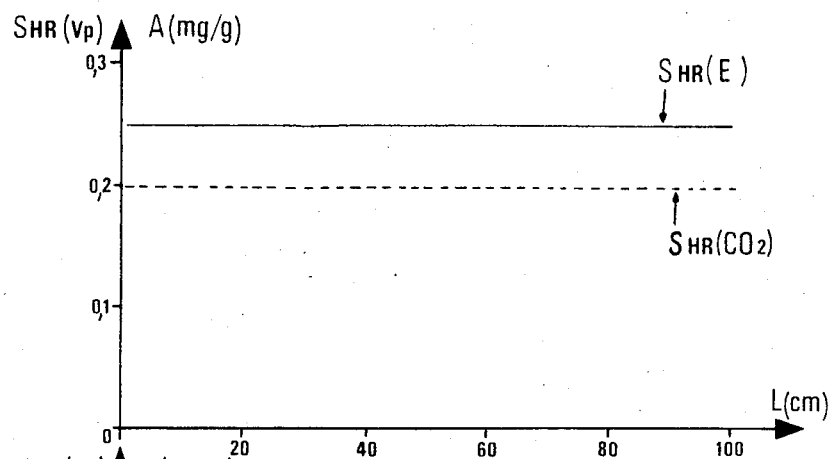
FIG. 2D shows the residual oil saturation on the one hand after injection of water and on the other hand after injection of carbon dioxide.
Figure 2E:
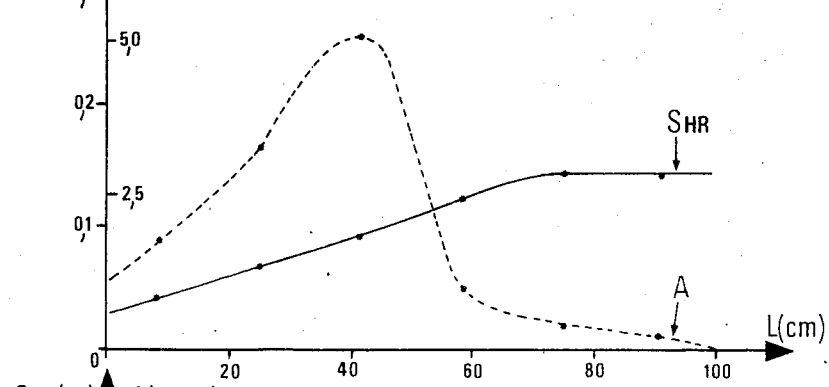
FIG. 2E illustrates the residual oil saturation and retention of sulfonate after injection of carbon dioxide, then a sulfonate soluble in water.

FIG. 2E shows the residual oil saturation $S_{HR}$ expressed as a fraction of the pore volume $V_P$ and the retention A of sulfonate, in milligrams per gram of rock, as a function of the length L (cm) of the porous medium, after injection of carbon dioxide followed by injection of petroleum sulfonate soluble in water. In this case, the sulfonate solution meets the adequate amount of calcium at the beginning of injection and displaces the oil efficiently. Nevertheless, after a relatively short distance, the porous medium retains the largest part of the surfactant and then the ability of the micellar solution to displace the oil decreases.

Thus, because of the phenomena which occur during displacement (bringing into solution of polyvalent cations, exchange of ions, preferential adsorption of certain surfactant molecules), it is difficult to adapt the micellar solution to the conditions, which will gradually be established, when a displacement fluid of homogeneous composition is injected.

The present invention provides a process for improving the enhanced recovery of crude oil from a geological formation forming an oil reservoir into which penetrate at least one injection well and at least one production well, with a significant cation exchange capacity. A displacement slug is introduced into an injection well comprising an anionic surfactant adapted for pushing the oil towards at least one production well and comprising several successively injected zones, some at least of which contain at least one anionic surfactant. Its solubility is adjusted so as to increase from one zone of the slug to the next, considering the order of introducing these different zones of the slug into the well.

Then an aqueous driving fluid is injected into the formation through an injection well, which pushes the displacement slug, which pushes the oil towards a production well.

The system forming the displacement slug contains more especially surfactants chosen so as to take into account the physical and chemical phenomena which occur in the carbonated and/or sandstone reservoir rocks containing clays and having a significant cation exchange capacity.

The process is particularly advantageous when the value of the ion exchange is between 0.1 and 10 milliequivalents (meq) of exchangeable ions per 100 grams of rock, and preferably between 1 and 3 meq. Consequently, the method guarantees a high oil recovery although it uses a moderate amount of surfactants.

For this, a solution is used containing different auxiliary agents in a variable concentration in addition to the anionic surfactant.

The anionic surfactant may be, by way of non limitative example, a sulfonate, a carboxylate, a phosphate, a phthalate, a sulfate, etc. or a mixture of these different products. It may have the following formula:

$$R_1-X_1^-M^+$$

in which $R_1$ is an aliphatic radical having 8 to 24 carbon atoms, or an alkoxyaromatic radical having 14 to 36 carbon atoms, $X_1^-$ is a polar radical of sulfonate, sulfate, carboxylate, phosphate, phthalate, etc. type and $M^+$ is generally a monovalent cation such as ammonium or an alkaline metal. The anionic surfactant may also be a petroleum sulfonate derived from the treatment of crude oil or a crude oil cut, by means of an oleum or sulfur trioxide.

For the sake of convenience and with reference to the examples given below, this anionic surfactant will be classed as a petroleum sulfonate.

The auxiliary agents which modify the initial solubility of the anionic surfactant in the injection water so that it increases gradually during the progression of the solution in the porous medium, may be, by way of non limitative example:

an aliphatic monoalcohol having from 4 to 18 carbon atoms, such as ethyl-2 hexanol for example, or any other polar substance such as amines, ketones, ethers, esters having a sufficient number of carbon atoms for reducing the solubility of the anionic surfactant in the injection water, fusel oil for example.

A surfactant of the alkyl- or alkylarylpolyglycol ether type, or of the alkyl- or alkylarylpolyglycol ether sulfate or phosphate or phtalate or carboxylate or sulfonate of alkaline metal or ammonium type. It may have the following formula:

$$R_2-O(CH_2CH_2O)_nH$$

where $R_2$ is an aliphatic radical with 8 to 24 carbon atoms, or an alkylaromatic radical with 14 to 36 carbon atoms and n has the value 1 to 50, or else $$R_3-O(CH_2CH_2O)_{m-1}CH_2CH_2X_2^-M^+$$

where $R_3$ and m have the same definition as $R_2$ and n, respectively, $X_2^-$ has the same definition as $X_1^-$ and $M^+$ is generally a monovalent cation such as ammonium or an alkaline metal.

This auxiliary surfactant is used to increase the solubility of the anionic surfactant in the injection water.

An aliphatic monoalcohol having 1 to 5 carbon atoms, such as isopropyl alcohol for example, or any other substance such as amines, ketones, ethers, esters having a sufficiently low number of carbon atoms for increasing the solubility of the anionic surfactant in the injection water.

Furthermore, the micellar solution may contain mobility control agents currently used in the enhanced oil recovery, such as a polyacrylamide, partially hydrolyzed or not, with a average molecular weight between $4 \times 10^6$ and $10 \times 10^6$ daltons, or a polysaccharide having a average molecular weight between $1 \times 10^6$ and $5 \times 10^6$ daltons. It may also contain a hydrocarbon formed by crude oil or a crude oil cut, or a cut of refined crude oil or a pure, aliphatic or cyclic hydrocarbon or a mixture of these different products.

The conditions which ensure regular displacement efficiency are established consequent to the ion transfers (ion exchanges, dissolution) and the chromatographic effects. The auxiliary agents protect the anionic surfactant against the risks of retention due to the composition modifications. They are chosen so that they not only avoid the risks of precipitation of the anionic surfactant but lead to systems having very low interfacial tensions which result from a synergic effect between the micellar solution and the divalent cations which come from the rock.

The invention, which takes advantage of the foreseeable interactions in a reservoir consists in adjusting the solubility gradient of the anionic surfactant in the injection water. The maximum value of this solubility in water must be adapted to the nature of the reservoir (rock, water, oil, temperature) and of the anionic surfactant, as well as to the kinetics of the phenomena. The solubility gradient is brought into being by means of a slug comprising several zones and in the following way:

The first part of the displacement slug injected is a micellar solution of an anionic surfactant whose composition is optimized with respect to the foreseeable conditions in the vicinity of the injection well, i.e. before any modification of the conditions. Since these conditions are variable depending on the reservoir, they require different methods of optimization: for example, when the formation water has a low salt content and when the available surfactant is preferably soluble in water, the balance between the hydrophile and lipophile tendencies of the surfactant, that is to say the reduction of its solubility in the injection water, is obtained by:

adding a surfactant preferably soluble in oil, and/or adding a long chain alcohol, and/or increasing the electrolyte concentration.

The second part of the slug is formed by an aqueous micellar solution of the anionic surfactant without auxiliary agents or containing small amounts of these auxiliary agents, depending on the conditions of application. This solution reaches its maximum efficiency after a longer travel path in the porous medium, consequent on the ion exchanges which it causes with the rock.

The third part of the slug is also an aqueous micellar solution which contains, with or without anionic surfactant one or more auxiliary agents whose purpose is to reduce the retention of the sulfonate: it may be a non ionic or anionic surfactant and/or an alcohol with small molecular weight. The auxiliary agents have low retention and thus maintain the properties of the solution at their optimum. In addition, they reduce the sensitivity of the micellar solution to the divalent ions. Finally, because of their ability to break up the emulsions and to desorb the surfactant molecules, they allow the retained anionic surfactant to be remobilized.

The fourth part of the slug is an aqueous fluid which may contain mobility control agents and/or auxiliary agents, in adequate concentrations, capable of reducing the retention of the anionic surfactant to the extent that they reinforce its solubility in the injection water.

The composition of this slug must be conceived in a flexible way so as to take into account the different possible conditions of application. For example, the displacement slug may be formed by more than four zones.

If the salinity of the injection water is sufficiently high and if an injection of carbon dioxide has been performed in a reservoir of rock containing alkaline-earth metal carbonates, thus substantially increasing the concentration of the divalent cations in solution, or if the anionic surfactant used is preferably soluble in oil, the injection should begin directly by the second part of the slug (see, for example, test 2F). The optimization of this second part is then achieved by taking into account the nature of the anionic surfactant and the reservoir conditions.

In what follows, the percentages are expressed in weight of active material. The salinity of the water present in the formation and/or used for displacing the oil is expressed in sodium chloride equivalent. It is advantageous if this salinity does not exceed substantially 3% in the different zones of the slug.

The inventors of the present invention have obtained very satisfactory results with waters whose salinity was close to 1.5%.

According to the invention, the first part of the slug has a total anionic surfactant concentration of 1 to 10% in the injection water, 0 to 5% of which is a surfactant preferably soluble in oil, the rest being formed by an anionic surfactant preferably soluble in water. In addition, the injection water contains from 0 to 5% of an alcohol with a high carbon number, such as ethyl-2-hexanol or fusel oil from 0 to 0.05 mole per liter of mono and/or divalent cation salts, such as $Ca^{++}$ and $Mg^{++}$, from 0 to 0.2% of a hydrosoluble polymer and from 0 to 10% of hydrocarbons. The size of this first part of the slug represents from 5 to 20% of the pore volume.

The second part of the slug is the injection water which contains from 1 to 10% of an anionic surfactant preferably soluble in water, from 0 to 2% of an auxiliary surfactant, from 0 to 5% of a low molecular weight alcohol, such as isopropyl alcohol, from 0 to 0.2% of a hydrosoluble polymer and from 0 to 10% of hydrocarbons. The size of this second part of the slug represents 5 to 30% of the pore volume.

The third part of the slug is the injection water which contains from 0 to 5% of an anionic surfactant preferably soluble in water, from 0.1 to 5% of an auxiliary surfactant, from 0.5 to 10% of a low molecular weight alcohol, such as isopropyl alcohol, from 0 to 0.2% of a hydrosoluble polymer and from 0 to 10% of hydrocarbons. The size of this third part of the slug represents from 5 to 30% of the pore volume.

The fourth part of the slug is the injection water which contains from 0 to 3% of an auxiliary surfactant, from 0 to 3% of a low molecular weight alcohol, such as isopropyl alcohol and from 0 to 0.2% of a hydrosoluble polymer. The size of this fourth part of the slug represents from 5 to 50% of the pore volume.

The above described displacement slug is driven towards the production well by the injection water which contains from 0 to 0.2% of a hydrosoluble polymer.

Figure 2F:
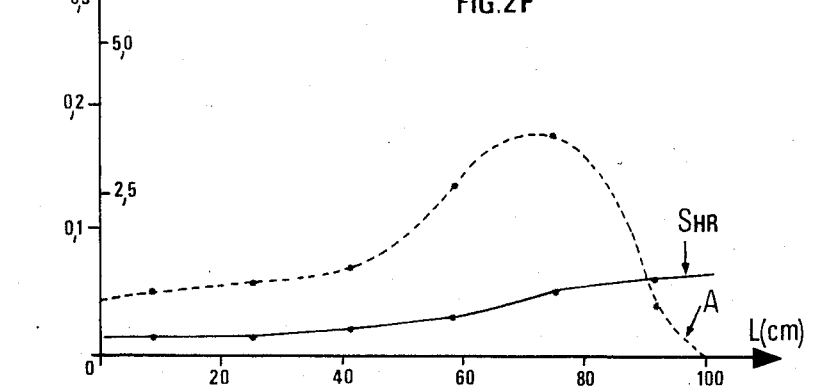
FIG. 2F shows the residual oil saturation and retention of sulfonate after injection of carbon dioxide, and a displacement slug according to with the invention.

FIGS. 1C and 2F, corresponding to displacement tests carried out in accordance with the invention, show the residual oil saturation $S_{HR}$ expressed as a function of the pore volume $V_p$ and the retention A, in milligrams per gram of rock, of the anionic surfactant as a function of the length L(cm) of the porous medium.

It can be seen that the trend of the curves is much more favorable than in the tests illustrated by FIGS. 1A, 1B and 2E, although the amount of surfactants used is practically the same in all cases, as will be seen further on. The description of the examples is given below.

EXAMPLE 1

(tests 1a, 1b, 1c)

A series of displacement tests was carried out at 95° C. and at a 100 bar pressure, in porous media from sandstone core samples coming from an oil field.

The following procedure was applied: the core samples were crushed, then forcibly packed in a stainless steel tube. The characteristics of the porous medium are given in table 1. The difference observed between the measured permeability to gas and the measured permeability to the formation water results from swelling of the clays during the circulation of the water.

TABLE 1

| EXAMPLE | EXAMPLE 1 (tests a, b, c) | EXAMPLE 2 (tests d, e, f) |
|---|---|---|
| Composition: | | |
| quartz (%) | 70 | 64 |
| calcite (%) | 20 | 33 |
| clays (%) | 10 | 3 |
| Dimensions | | |
| length (cm) | 100 | 100 |
| diameter (cm) | 2.5 | 5 |
| Porosity | 0.34 ± 0.01 | 0.38 ± 0.01 |
| Permeability ($\mu\eta2$): | | |
| to gas | $200 \pm 10 \times 10^{-3}$ | $150 \pm 10 \times 10^{-3}$ |
| to the formation water | $50 \pm 10 \times 10^{-3}$ | $47 \pm 10 \times 10^{-3}$ |
| Cation exchange capacity (milliequivalent of exchangeable ions per 100 g of rock) | 2.4 | 1.4 |

1. Injection of water and oil

The porous medium was first of all saturated with the formation water of the field whose total salinity was 0.46%. This water was then displaced by injecting the oil of the reservoir from which the gas had been removed (stock-tank oil) (at 20° C., specific gravity 0.809 g/l, viscosity 3.2 mPa.s). The irreducible water saturation is 0.37±0.01. Then the stock-tank oil was replaced by the oil saturated with the gas of the reservoir at 100 bar and 95° C. The gas/oil ratio was 54 m³/m³. Finally, displacement of the oil by the injection water, having 0.40% salt content, was carried out at a filtration rate of one meter per day. The residual oil saturation obtained was 0.34±0.01, i.e. an oil recovery of 46%.

2. Injection of surfactants

Three formulations were used:

Test 1a: After injection of water, an aqueous solution representing 30% of the pore volume and formed by the injection water containing 3% of a petroleum sulfonate, of mahogany type and having an equivalent average molecular weight of 460, was injected, then pushed by a volume of injection water representing 100% of the pore volume. The mean value of the residual oil saturation decreased from 0.34 to 0.23, i.e. a total oil recovery of 63%.

Test 1b: After injection of water, an aqueous solution representing 30% of the pore volume and formed by the injection water containing 3% of petroleum sulfonate containing, in addition to mahogany type molecules, about 20% of di- and polysulfonated molecules (the equivalent average molecular weight of the mixture being in the range of 400), was injected then pushed by a volume of injection water representing 100% of the pore volume. The mean value of the residual oil saturation decreased from 0.34 to 0.19, i.e. a total oil recovery of 70%.

Test 1c: After injection of water, and in accordance with the method described in the invention, the following displacing fluids were injected successively:

(1) An aqueous solution representing 5% of the pore volume and formed by the injection water containing 3% of the petroleum sulfonate described in test 1b and 0.5% of fusel oil.

(2) An aqueous solution, representing 10% of the pore volume, formed by the injection water containing 3% of the petroleum sulfonate described in test 1b.

(3) An aqueous solution, representing 15% of the pore volume, formed by the injection water containing 2.45% of the petroleum sulfonate described in test 1b and 0.27% of an ethoxlated alcohol, of formula $R-O(CH_2-CH_2O)_nH$, where R is an aliphatic radical with 15 carbon atoms on average and n has the average value of 15.

(4) An aqueous solution, representing 10% of the pore volume, formed by the injection water containing 0.41% of the ethoxylated alcohol previously described and 1% of isopropyl alcohol.

This displacement slug was pushed by a volume of injection water representing 100% of the pore volume. The mean value of the residual oil saturation decreased from 0.34 to 0.06, i.e. a total oil recovery of 90%.

After each displacement experiment, the porous medium was removed from the steel tube by drilling, then split up into six sections in which the residual oil saturation $S_{HR}$ and the retention A of the sulfonate were determined.

For tests 1a, 1b, 1c these results are shown in FIGS. 1A, 1B and 1C, respectively, as a function of the length of the porous medium. It is clear from these Figures that the high oil recovery rate in test 1c is due to the high efficiency of the micellar solution over the whole length of the porous medium, whereas this efficiency is optimum only in the initial part of the porous medium pattern in test 1a and in the central part in test 1b.

Figure 3:
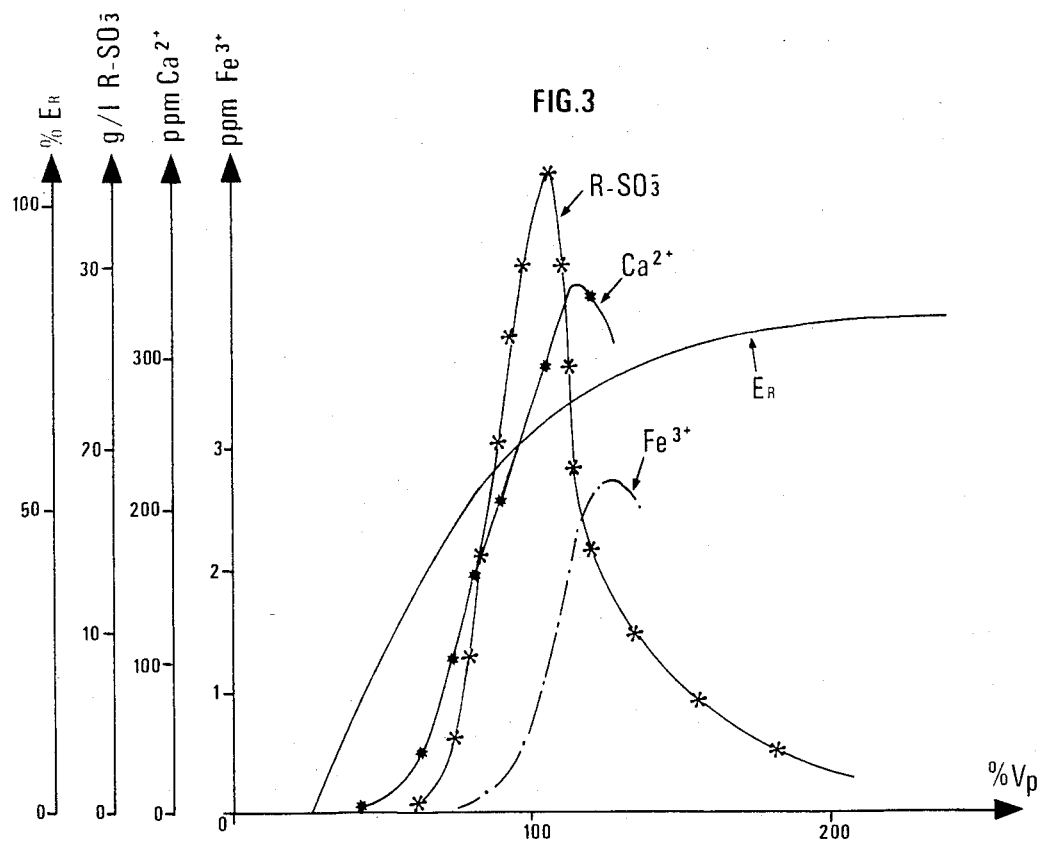
FIG. 3 shows the sulfonate, calcium and iron concentration in the organic phase of the effluent relative to test 1C, according to the invention, as well as the volume of oil recovered.

By way of illustration, FIG. 3 shows the elution of the $Ca^{++}$ and $Fe^{+++}$ ions (concentrations expressed in parts per million) which accompany the sulfonate leaving the porous medium (concentration expressed in grams per liter), as well as the volume of oil recovered $E_R$ (expressed in % of the oil in place after secondary recovery) by the micellar solution injected in test 1c.

EXAMPLE 2

(tests 2d, 2e, 2f)

A series of displacement tests was carried out, at 64° C. and at a 100 bar pressure, in the same displacement device as for example 1, using sandstone core samples coming from an oil field. The characteristics of the porous medium are given in table 1.

1. Injection of water and oil

The porous medium was first of all saturated with the formation water of the oil field whose total salinity was 1%. This water was then displaced by injection of the stock-tank oil of the reservoir (at 20° C., specific gravity 0.825 g/l, viscosity 3.8 mPa.s). The irreducible water saturation was 0.37±0.01. Then the stock-tank oil was replaced by the oil containing the gas of the reservoir. The gas/oil ratio was 56 m³/m³. Finally, the displacement of the oil by the injection water with a salt content of 0.6% was carried out at a filtration rate of one meter per day. The residual oil saturation obtained was 0.25±0.01, i.e. an oil recovery of 60%.

2. Injection of carbon dioxide (test 2d)

Following the injection of water, a volume of gas representing 30% of the pore volume and containing 82% by volume of carbon dioxide, was injected at a 100 bar pressure, then pushed by the injection water. The residual oil saturation decreased from 0.25 to 0.20, i.e. a total recovery due to the water and the carbon dioxide of 68%. It is certain that at a 100 bar pressure, the optimum conditions of efficiency of the carbon dioxide are not generally reached and that the oil recovery is only partial. Nevertheless, such conditions may have been chosen for economic reasons. The example described here is to demonstrate that the injection of a micellar solution is not less efficient after such an injection.

3. Injection of surfactants

After the injection of water followed by the injection of carbon dioxide two variants were tested, the first one according to the prior art (test 2e), the second according to the invention (test 2f):

Test b 2e: An aqueous solution representing 45% of the pore volume formed by the injection water containing 2% of the petroleum sulfonate described in test 1b was injected, then pushed by a volume of injection water representing 100% of the pore volume. The residual oil saturation decreased from 0.20 to 0.10, i.e. a total oil recovery of 84%.

Test 2f: The following displacing fluids were injected successively, in accordance with the invention:

(1) An aqueous solution representing 20% of the pore volume formed by the injection water containing 1.7% of the petroleum sulfonate described in test 1b and 0.04% of a sodium sulfate alkylether, of formula:

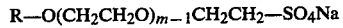

$$R-O(CH_2CH_2O)_{m-1}CH_2CH_2-SO_4Na$$

in which R is an aliphatic radical with 15 carbon atoms on average and m has the mean value of 15.

(2) An aqueous solution representing 25% of the pore volume formed by the injection water containing 1.7% of the petroleum sulfonate described in test 1b and 0.036% of the previously described sodium sulfate alkylether.

(3) An aqueous solution representing 10% of the pore volume and formed by the injection water containing 0.23% of the previously described sodium sulfate alkylether and 1.5% of isopropyl alcohol.

This displacement slug was driven by a volume of injection water repesenting 100% of the pore volume. The residual oil saturation decreased from 0.20 to 0.03, i.e. a total oil recovery of 95%.

After each test, the porous medium was removed from the steel tube by drilling, then split up into six sections in which the residual oil saturation $S_{HR}$ and the retention A of the sulfonate were determined. In test 2d (FIG. 2D) it was found that the residual oil saturation $S_{HR}$ ($CO_2$), expressed as a fraction of the pore volume, $V_p$, after injection of carbon dioxide, was uniform over the whole length L(cm) of the porous medium, as well as the residual oil saturation $S_{HR}$ (E) after the injection of water, whereas, after injection of the surfactants (tests 2e and 2f), the distribution of the residual oil saturation and of the sulfonate changed in a characteristic manner.

FIGS. 2E and 2F illustrate these distributions. It is apparent that the high recovery obtained by applying the method described in the invention (test 2f) is due to the fact that the residual oil saturation is reduced to a minimum over the whole length of the porous medium, whereas in test 2e the efficiency of the surfactant solution is limited to the first half of porous medium. It may also be concluded that in this latter test the largest amount of the sulfonate is retained in the porous medium.

In tests 1a, 1b, 1c, 2e, and 2f, the amounts of surfactants used, of a high cost, are practically identical. The increase in cost of the process in accordance with the invention, related to the use of alcohols, is very largely compensated by the oil recovery increase. This is clearly shown in Table 2, in which are shown, for the different tests, the surfactant consumption (expressed by the product of the concentration, in %, multiplied by the injected volume, as a % of the pore volume), the total oil recovery (expressed as a % of the initial oil) and the gain acquired by the invention (expressed as a % of the results acquired in the prior art).

| TEST | Surfactant consumption (alcohols excluded) (% × $V_p$) | Total Recovery (%) | Gain with respect to the tests | | |
|---|---|---|---|---|---|
| | | | 1a | 1b | 2e |
| 1a* | 0.900 | 63% | | | |
| 1b* | 0.900 | 70% | | | |
| 1c** | 0.899 | 90% | +42.9% | +28.6% | |
| 2e* | 0.900 | 84% | | | |
| 2f** | 0.886 | 95% | | | +13.1% |

*prior art
**according to the invention

To put the invention into practice requires reservoir rocks having a significant cation exchange capacity. Apart from this requirement, the reservoir conditions which might limit the use of the process of the invention are the same as those which apply to the prior art.

What is claimed is:

1. A process for improving the enhanced recovery of crude oil from a geological formation forming an oil reservoir, with a significant cation exchange capacity, which comprises injecting an aqueous driving fluid containing injection water into the formation through at least one injection well, after introducing into the injection well an aqueous displacement slug adapted to push the oil to at least one production well, said slug containing a micellar solution of an anionic surfactant in injection water, being adapted to exchange ions with the formation and being formed of a plurality of successively injected zones; at least some of said zones containing at least one anionic surfactant to provide a surfactant gradient concentration decreasing over a portion of the slug with the lowest concentration being at the zone last introduced into the injection well, the slug zone introduced first into the injection well containing an auxiliary agent which reduce the solubility of the anionic surfactant in the injection water and the slug zone introduced last into the injection well containing an auxiliary agent which enhances the solubility in the injection water of the anionic surfactant brought to the formation by previously injected zones of the slug to maintain the slug efficiency at an optimum value throughout the plurality of zones of the slug.

2. The process as claimed in claim 1, wherein the first zone of said slug which contains an auxiliary agent reducing the solubility of the anionic surfactant in the injection water has a volume between 5% and 20% of the pore volume of said formation.

3. The process as claimed in claim 1, wherein the last zone of the slug which contains an auxiliary agent enhancing the solubility of the anionic surfactant in the injection water has a volume between 5% and 50% of the pore volume of said formation.

4. The process as claimed in claim 1, wherein said zone which contains auxiliary agents reducing the solubility of the anionic surfactant in the injection water has a volume between 5% and 20% of the pore volume of said formation and wherein said zone which contains auxiliary agents increasing the solubility of the anionic surfactant in the injection water has a volume between 5% and 50% of the pore volume of said formation.

5. The process as claimed in claim 1, wherein said zone introduced first into said injection well which contains an auxiliary agent reducing the solubility in the injection water of the anionic surfactant contains from 1 to 10% by weight of the anionic surfactant, from 0 to 5% by weight of an alcohol having a high number of carbon atoms, mono and/or divalent cation salts at a concentration between 0 and 0.05 mole per liter, from 0 to 0.2% by weight of a hydrosoluble polymer and from 0 to 10% by weight of hydrocarbons.

6. The process as claimed in claim 1, wherein said zone introduced last into the injection well contains from 0 to 3% by weight of at least one auxiliary surfactant, from 0 to 3% by weight of a low molecular weight alcohol and from 0 to 0.2% by weight of a hydrosoluble polymer, to enhance the solubility in the aqueous driving fluid of the anionic surfactant introduced into the formation by the slug zones injected before said last zone.

7. The process as claimed in claim 1, wherein a slug is injected which comprises at least two successive zones injected between said first and last zones, one of these two successive zones which is injected first having an aqueous phase containing from 1 to 10% by weight of the anionic surfactant soluble in the injection water, from 0 to 2% by weight of at least one auxiliary surfactant increasing the solubility in the injection water of the anionic surfactant, from 0 to 5% by weight of a low molecular weight alcohol, from 0 to 0.2% by weight of a hydrosoluble polymer and from 0 to 10% by weight of hydrocarbons, the other of said two successive zones which is injected secondly having an aqueous phase which contains from 0 to 5% by weight of an anionic surfactant having a high solubility in the injection water, from 0.1 to 5% by weight of at least one auxiliary surfactant, from 0.5 to 10% by weight of a low molecular weight alcohol, from 0 to 0.2% by weight of a hydrosoluble polymer and from 0 to 10% by weight of hydrocarbons.

8. The process as claimed in claim 7, wherein that one of said two successive zones which is injected first has a volume between 5 and 30% of the pore volume of said formation and that one of said two successive zones which is injected secondly has a volume between 5 and 30% of the pore volume of said formation.

9. The process as claimed in claim 1, wherein the introduction of said displacement slug is preceded by an injection of carbon dioxide.

10. The process as claimed in claim 1, applied to a crude oil reservoir with an cation exchange capacity between 0.1 and 10 milliequivalents per 100 grams of rock.

* * * * *